United States Patent [19]

VanBuskirk

[11] Patent Number: 5,081,174

[45] Date of Patent: Jan. 14, 1992

[54] PROTECTIVE COATING COMPOSITION

[75] Inventor: Ellor J. VanBuskirk, Pittsburgh, Pa.

[73] Assignee: PPG Industries, Inc., Pittsburgh, Pa.

[21] Appl. No.: 415,509

[22] Filed: Oct. 2, 1989

Related U.S. Application Data

[63] Continuation-in-part of Ser. No. 255,286, Oct. 11, 1988, Pat. No. 4,942,193.

[51] Int. Cl.$^5$ .............. C08L 91/06; C08K 3/24; B05D 1/38; B65B 33/00
[52] U.S. Cl. .................... 524/277; 524/275; 524/279; 524/487; 524/489; 427/156; 134/4
[58] Field of Search ............. 524/275, 272, 279, 487, 524/488, 489; 427/156; 134/4

[56] References Cited

U.S. PATENT DOCUMENTS

| 4,013,607 | 3/1977 | Dwyer et al. | 524/428 |
| 4,168,255 | 9/1879 | Lewis et al. | 524/277 |
| 4,289,671 | 9/1981 | Hernandez | 524/275 |
| 4,317,755 | 3/1982 | Gregory | 524/276 |
| 4,390,436 | 6/1983 | Hernandez | 524/275 |
| 4,540,736 | 9/1985 | Herten et al. | 524/556 |
| 4,562,226 | 12/1985 | Coombes et al. | 424/767 |
| 4,693,909 | 9/1987 | Ziegler et al. | 427/156 |
| 4,826,902 | 5/1989 | Hanabata et al. | 524/524 |

FOREIGN PATENT DOCUMENTS 2158831 11/1985 United Kingdom .

Primary Examiner—Melvyn I. Marquis
Assistant Examiner—Vasu S. Jagannathan
Attorney, Agent, or Firm—Dennis G. Millman; Godfried R. Akorli

[57] ABSTRACT

A formable, weldable, removable protective coating composition for use on metals, said coating comprising a combination of a base-neutralized acid-funtional copolymer and a wax lubricant, and further comprising a removability enhancing means such as phosphoric acid as an additive to the coating composition.

3 Claims, No Drawings

PROTECTIVE COATING COMPOSITION

This is a continuation-in-part of application Ser. No. 07/255,286, filed Oct. 11, 1988, now U.S. Pat. No. 4,942,193.

BACKGROUND OF THE INVENTION

The present invention relates to an improved protective coating composition which is useful in passivating a metallic substrate. More specifically, the invention relates to an aqueous temporary protective coating composition comprising an addition polymer and a wax, said composition is useful as a mill passivating composition characterized in that it is easily removable from the substrate.

BRIEF DESCRIPTION OF THE PRIOR ART

Passivation of a metal in a mill is done, in the main, with a mill oil or a chemical treatment in order to prevent or reduce corrosion, particularly white rust. One shortcoming of the mill oil is the difficulty in removing it effectively and the less than desired corrosion protection provided thereby. A shortcoming of the chemical treatment, particularly with a film-forming material, is its incompatibility with a subsequently employed material or process in treating the substrate.

It is generally known in the art to employ a protective coating composition comprising an alkali-soluble polymer. In the main, the art-known composition is employed distinctly on a painted or polished surface and is less effective on an untreated metallic substrate.

In contrast, the protective coating composition, which is of interest here, should be suited to the application to a bare metallic substrate. Additionally, the protective coating composition should be compatible with a subsequently applied pretreatment composition; it should be formable, weldable, and removable with an aqueous alkaline solution; and it should be able to prevent or reduce corrosion, particularly in the form of white rust. This type of a temporary protective coating composition is provided.

By this invention, the protective coating composition is adapted to contain a means for solving problems of removability that attend certain metal surfaces.

SUMMARY OF THE INVENTION

In accordance with the foregoing, the present invention encompasses: an improved formable, weldable, removable aqueous protective coating composition for a metallic substrate, said composition comprises a combination of a base neutralized acid-functional polymer and a lubricant wax, the improvement comprising an effective amount of a removability enhancing means.

In the present embodiment of the invention, the removability enhancing means comprises an acid or a salt of said acid or a mixture thereof in an amount sufficient to enhance the removability of the applied coating from the metallic substrate. Phosphoric acid or an ammonium phosphate salt thereof is preferred herein as an additive to the coating composition, in a small but effective amount of about 0.001 to 1 percent by weight based on the total resin solids of the protective coating composition.

In accordance with this invention, the removability enhancing means further encompasses a process for removing the protective coating comprising neutralizing an active metal substrate surface before the protective coating is applied thereto.

In the present embodiment of the invention, the protective coating composition comprises a base neutralized acid-functional polymer in combination with a wax lubricant and the acid additive. The acid-functional polymer in combination with a wax is prepared by copolymerization of an acid-functional ethylenically unsaturated monomer in a solvent in the presence of a wax such as a hydrocarbon wax. The resultant composition is dispersed in water in the presence of a base such as ammonium hydroxide.

The protective coating composition in the preferred embodiment is found to produce a coating which is corrosion resistant, drawable, formable, weldable, and easily removable with an aqueous alkaline solution. The term "formable" or "formability" is defined as the ability of a coated sheet of metal to be bent without creating a substantial crack or void in the film. The term "drawable" or "drawability" is defined as the ability to stamp a coated sheet of metal into a curved multi-dimensional, e.g., three-dimensional shape without substantially breaking the sheet and without significantly damaging the coated sheet of metal. The term "weldable" or "weldability" is defined as the ability to perform spot welding on a coated sheet of metal using a conventional spot welding tip and pressure.

The protective coating composition of this invention is characterized by remarkable improvement in removability.

DETAILED DESCRIPTION OF THE INVENTION

The aqueous protective coating composition of this invention in the preferred embodiment is characterized as being drawable, formable, weldable, and removable with an aqueous alkaline solution. This and other aspects of the claimed protective coating composition are described more fully below.

The base neutralized acid-functional polymer that is employed herein has a calculated glass transition temperature (Tg) of about $-30°$ C. to $100°$ C. and preferably about $-15°$ C. to $30°$ C, and a weight average molecular weight of about 1,000 to 90,000 and preferably about 5,000 to 30,000 (as measured by gel permeation chromatography based on polystyrene standard). The Tg of the polymer is a measure of the hardness and melt flow of the polymer. The higher the Tg, the less melt flow and the coating is harder. The Tg is described in PRINCIPLES OF POLYMER CHEMISTRY (1953), Cornell University Press. The Tg value can be actually measured or it can be calculated as described by Fox in BULLETIN OF AMERICAN PHYSICS SOCIETY, 1,3, page 123 (1956). "Tg" as used herein refers to the calculated value.

Typically, the polymer is a solution polymerized free-radical addition polymer. In accordance with this invention, the acid-functional polymer can be prepared by polymerizing an ethylenically unsaturated monomer in a solvent medium. There is employed a polymerizable monomer which is an acid-functional monomer. Examples of the acid-functional monomer can be acrylic acid, methacrylic acid, crotonic acid, itaconic acid, maleic acid, or the like. An amount of about 5 to 100 percent by weight of the acid-functional monomer based on the total monomer content can be employed. Typically, an amount of about 10 to 40 and preferably about 10 to 30 percent by weight is employed. A copolymerizable ethylenically unsaturated monomer such as another vinyl monomer, e.g., styrene, vinyl toluene and the like, an ester of acrylic or methacrylic acid, such as methyl methacrylate, butyl acrylate, and 2-ethylhexylacrylate, can be employed.

The wax lubricant is believed to impart the property of drawability to the protective coating composition. Typically, the wax lubricant has a melting point of about 140° F. Suitable waxes of varying melting points and grades can be a hydrocarbon wax, a bees wax, a carnauba wax, a petrolatum wax, and a mixture thereof. The amount of wax ranging from about 5 to 70 and preferably about 10 to 30 percent by weight, based on the total weight of the wax and the aforestated polymer is employed herein. It is envisioned that instead of a wax, another lubricant may be used herein. A non-limiting example thereof can be a silicone fluid, molybdenum disulfide, graphite, a hydrocarbon oil, a vegetable oil, a fatty acid, or the like. Preferably, the lubricant consists essentially of a wax.

In the preferred embodiment of the invention, the polymer is prepared in the presence of the wax that can impart properties of drawability to the Protective coating. Resulting therefrom is a wax-containing acid-functional polymer. It is believed without being bound thereby that when the polymer is prepared in the presence of wax, a graft of the wax and the polymer are thereby formed. In this embodiment, the protective coating composition of this polymer can have a marked improvement in removability. It should, however, be realized that in other embodiments of the invention, a polymer can be prepared in the absence of a wax and then employed in combination with a wax which is preferably in the form of a powder or liquid.

The protective coating composition may contain an additive such as graphite which enhances conductivity of the applied protective coating composition during welding. Graphite is usually employed in a particulate form, in an amount sufficient to effect welding of a film of a relatively higher thickness. It is recommended to employ graphite in a film of about 1.5 milligrams per square inch or higher.

The protective coating composition can be prepared by thinning the combination of the base-neutralized acid-functional polymer and the wax lubricant with water to a conducive application viscosity. This can be done by at least partially neutralizing the acid-functional polymer with a base in the presence of water. Neutralization can be conducted before or during the thinning with water. A volatile neutralizing agent is preferred. By the term "volatile", it is meant that the neutralizing agent leaves the applied coating when it is dried or baked. An illustrative example of the neutralizing agent can be ammonia, including ammonium hydroxide, primary, secondary or tertiary amine, e.g., ethanolamine, diethanolamine, N-methylethanolamine, dimethylethanolamine, methylamine, ethylamine, triethylamine, morpholine or alkyl morpholine. The neutralized acid-functional polymer in the presence of water is characterized herein as water-based polymer. A composition containing the water-based polymer in combination with the wax lubricant is characterized as an aqueous protective coating composition.

As afore-stated, the improvement herein comprises a means for enhancing removability of the aqueous protective coating composition. It is believed without being bound that removability of the protective coating becomes difficult when the protective coating composition reacts with the metallic substrate, particularly when the surface of the substrate is activated. The term "activated" as used here is intended to denote that the surface of the metal substrate is such as would react with the protective coating composition. Illustratively, the surface of a freshly prepared metal is generally activated. Also, the surface of a metal substrate can become activated through chemical reaction as more fully discussed hereinafter.

Non-limiting examples of a surface which is coated can be a zinc-coated substrate such as hot-dipped galvanized, galvaneal, electrozinc, electrozinc-iron, electro co-plated alloy of zinc, including zinc-nickel, zinc-cobalt or zinc-manganese. The removability enhancing means can interact with the activated surface of the metal substrate and prevent it from reacting with the protective coating composition.

While not being bound by any particular theory, it is believed that the protective coating can be subject to an adverse reaction with a metal ion at the metal surface. It is believed that the metal ion can act as a crosslinking agent for the acid-functional polymer of the protective coating.

Crosslinking can impair removability of a temporary protective coating. In accordance with this invention, it is believed that the presence of a removability enhancing aid, such as phosphoric acid (in the form of a phosphate ion), can inhibit the adverse reactions by converting a metallic specie into an insoluble form such as a metal phosphate.

In preparing the protective coating composition, an additive, such as a defoamer, a wetting agent, or an additional cosolvent, may be employed herein. It is a distinct feature of this invention that the protective coating composition is free of or substantially free of an external surfactant which can cause water sensitivity and poor corrosion resistance.

In the practice of the invention, the protective coating composition can be applied to a metallic substrate by a conventional method such as spraying, brushing, dipping, roller coating, curtain coating or the like. A coating weight of about 0.3 to 4, preferably about 0.5 to 3, and more preferably about 1.0 to 2.0 milligrams per square inch is obtained. It would, of course, be realized that a substrate with a different surface roughness and porosity may require a different coating weight. The applied coating can be air dried or forced dried or baked in a short period of time. The resultant coating has been found to be flexible and block resistant, i.e., the coated substrate is resistant to sticking together when stacked. It is of note that the coated substrate can be used as such, i.e., without removing the protective coating therefrom.

Nonetheless, removal of the applied coating is easily effected by contacting the coated substrate with an aqueous alkaline cleaner. "Contacting" means spraying, flooding, dipping (immersion) or the like can be employed. It is noteworthy that in an actual production practice, a conventional lubricant which is not subjected to the direct impingement of a sprayed cleaner is not satisfactorily removed from inside an enclosed portion of a manufactured article. The improved removability of the protective coating from an enclosed area of an article by immersion enables better pretreatment of the area. Consequently, adhesion of a subsequently applied paint layer is significantly improved. Thus, the use of coating composition of this invention can remarkably improve the corrosion resistance of a manufactured article.

The concentration of the cleaner will depend on its nature, the temperature of removal, and the degree of neutralization of the coating by the cleaner. With the protective coating removed therefrom, the substrate can be used as such, or subjected to other coating processes such as conversion coating. It is a distinct feature of the invention that the protective coating of this invention can be removed effectively by immersion cleaning at ambient temperatures.

As afore-stated, the removability enhancing means further comprises a process for neutralizing an active metal substrate surface before applying the protective coating thereto. The metal surface is usually active when it is fresh. This is usually the case immediately after the metal has been produced or immediately after the metal surface has been cleaned, particularly in a manner that renders the surface alkaline. Neutralization of the metal surface usually entails cleaning the surface with an acidic solution. An example of the acidic solution can be an aqueous solution of acetic acid, phosphoric acid, sulfuric acid, nitric acid, floroboric acid or a mixture thereof. This process can be employed in conjunction with the means of incorporating the acid or a salt thereof as an additive into the temporary protective coating composition.

Since it is relatively easy to remove the protective coating of this invention, it is believed that the protective coating composition may be employed by itself or with a mill oil or other compatible lubricants applied thereon, usually in a relatively low amount. The protective coating and the mill oil will be removable, drawable, formable, weldable and corrosion resistant. With the protective coating (with or without mill oil) removed therefrom, the substrate can be used without further treatment or subjected to subsequent coating processes.

The following are additional but non-limiting illustrations of the invention.

EXAMPLE IA

This example illustrates the preparation of a protective coating composition comprising a wax-containing water-based acrylic polymer.

A reaction vessel equipped with thermometer, stirrer, dropping funnels, reflux condenser and means for maintaining a blanket of nitrogen was charged at room temperature with a composition consisting of a mixture of 135 grams of butyl CELLOSOLVE, 22.5 grams of butanol, and 101.3 grams of SHELLMAX (a petroleum wax having a softening point of about 60° C., available from Shell Oil Company). The composition was heated over a period of about 30 minutes to reflux. When the reflux temperature was attained, the simultaneous, gradual addition to the vessel of Charge A and Charge X were started and continued for three hours while maintaining reflux. Charge A consisted of a mixture of 317.2 grams of butyl acrylate, 202.5 grams of styrene, 135.0 grams of acrylic acid, 20.3 grams of diethyl aminoethyl methacrylate, and Charge X consisted of a mixture of 6.8 grams of butyl CELLOSOLVE and 20.3 grams of t-butyl perbenzoate. When the addition of Charges A and X were completed at 150° C., Charge B comprising 2.3 grams of butyl CELLOSOLVE plus 2.3 grams of t-butyl perbenzoate were added and the reaction mixture was held for two hours. Charge C comprising 2.3 grams of t-butyl perbenzoate and 2.3 grams of butyl CELLOSOLVE was added at 141° C. and the reaction mixture was held for one hour. The reaction mixture was then cooled to 79° C. (A 50/50 by weight mixture of polymer/M-pryol had a Z-5 Gardner-Holdt viscosity at 41.1 percent solids.) Feed D comprising 112.5 grams of deionized water and 107.1 grams of 28 percent of ammonia was added over 15 minutes and held for 15 minutes. Feed E comprising additional 1968.0 grams of deionized water was added to the reaction mixture for 1.5 hours at 72° C. Analysis: Milliequivalents of acid was 0.429, milliequivalents of base was 0.453, weight average molecular weight (Mw) was 10,924, viscosity was 4320 centipoises (Brookfield No. 4 spindle) at 20 revolutions per minute (RPM), pH was 9.30 and percent solids was 22.9 (measured at 110° C. for two hours).

EXAMPLE IB

This example further illustrates the preparation of a protective coating composition comprising a wax-containing water-based acrylic polymer. The following were used in the preparation:

| Ingredients | Parts by Weight |
|---|---|
| Reactor Charge | |
| Butyl CELLOSOLVE | 140.0 |
| Butanol | 23.3 |
| SHELLMAX | 483.0 |
| Charge X | |
| Butyl CELLOSOLVE | 7.00 |
| t-Butyl perbenzoate | 9.7 |
| Charge A | |
| Acrylic acid | 322.0 |
| 1 Dodecanethiol | 4.8 |
| Charge B | |
| Butyl CELLOSOLVE | 2.4 |
| t-butyl perbenzoate | 2.4 |
| Charge C | |
| Butyl CELLOSOLVE | 2.4 |
| t-butyl perbenzoate | 2.4 |
| Charge D | |
| Deionized water | 117.0 |
| Ammonium hydroxide | 271.1 |
| Charge E | |
| Deionized water | 2040 |

A reaction vessel equipped with thermometer, stirrer, dropping funnels, reflux condenser and means for maintaining a blanket of nitrogen was charged at room temperature with a composition consisting of the reactor charge. The composition was heated over a period of about 30 minutes to reflux. When the reflux temperature was attained, the simultaneous, gradual addition to the vessels of Charge A and Charge X was started and continued for over three hours while maintaining reflux. When the addition of Charges A and X were completed at 135° C., Charge B was added and the reaction mixture was held for two hours. Charge C was added at 125° C. and the reaction mixture was held for one hour. The reaction mixture was then cooled to 80° C. (resin solids was 82.2 percent). Feed D was added into the reaction mixture for over 15 minutes and held for 15 minutes. Feed E was added to the reaction mixture over 1.5 hours at 72° C. Analysis: Milliequivalents of acid was 0.921, milliequivalents of base was 0.805, weight average molecular weight was 1410, viscosity was 465 centipoises (Brookfield No. 4 spindle) at 20 RPM, pH was 7.10 and percent solids was 26.8 percent (measured at 110° C. for two hours).

EXAMPLE II

The water-based acrylic polymer of Example IA was thinned to 12 percent solids with water and flow coated over freshly cleaned electro-galvanized panels. After air drying for 15 minutes until tack-free, the panels were force dried for 5 minutes at 105° C. A film weight of 0.8 to 0.9 milligrams per square inch resulted.

EXAMPLE III

The water-based acrylic polymer of Example IB was thinned to 20 percent solids, applied by a No. 6 wire-wound drawbar to a freshly cleaned electrogalvanized panel, baked for 50 seconds at 550° F. to a peak metal temperature of 420° F. and quenched. A film weight of 1.1 milligrams per square inch resulted. This coated panel was immersed in a commercial alkaline cleaner for one minute at 140° F. and rinsed for 30 seconds in hot tap water. A clean, water break-free panel resulted, indicating a high degree of cleanliness.

COMPARATIVE EXAMPLE I

As an experimental control for the panels of Example II, freshly cleaned electrogalvanized panels were coated with a commercially available mill oil to protect galvanized and other steel substrate from corrosion. QUAKER 61A-US oil, available from Quaker Chemical Company, was applied by putting two drops thereof on a 4×12-inch panel and rubbing the drops with the finger of a clean white cotton glove which had been soaked in the same oil. A film weight of 0.6 to 0.8 milligrams per square inch resulted, which was higher than the approximately 0.4 milligrams per square inch of oil found on commercially available electrogalvanized steel as shipped.

EXAMPLE IV

HUMIDITY CORROSION TEST (a) Panels from Example II and the Comparative Example I (control) were stacked together, clamped, and stored in a humidity cabinet for one week at 100 percent relative humidity and 115±5° F.

After removal from the humidity cabinet, the test panels from Example II were cleaned by immersion in a one percent solution of an alkaline cleaner for 30 seconds at 150° F. The cleaner, CHEMKLEEN 49, is available from Chemfil Corporation. After rinsing, the panels were "water break free" indicating a high degree of cleanliness. When these humidity-tested panels were compared visually to untested panels cleaned in the same way, there was little, if any, color change apparent in the humidity-tested panels. The lack of color change indicated that very little oxidation of the zinc layer had taken place.

After removal from the humidity cabinet, panels from Comparative Example I (mill oil) were immersed for three minutes in the same one percent solution of alkaline cleaner. After rinsing, water beaded up on the panels indicating that the panels were not clean. After solvent wiping and additional immersion cleaning for 30 seconds, the panels were water break free and judged to be clean. When these humidity-tested panels were compared visually to untested panels (which were cleaned in the same manner), it was found that the humidity-tested panels were significantly darker than the untested panels. A gray swirling pattern indicated that significant oxidation of the zinc had occurred.

COMPARATIVE EXAMPLE II

FABRICATION TEST

As an experimental control for a fabrication test, a commercially available water-borne drawing lubricant, PILLSBURY FB-27MC available from Pillsbury Chemical & Oil, Inc. (Detroit), was applied to freshly cleaned electrogalvanized panels. Eighteen drops of the FB-27MC lubricant were distributed over a 5×13-inch panel area with the finger of a clean white cotton glove which was soaked in the same lubricant and allowed to dry. Approximately 0.6 milligrams per square inch of lubricant resulted.

EXAMPLE V

To test drawability and lubricity of the protective coating composition of Example II, additional electrogalvanized panels were coated by the same method as disclosed in Example II at coating weights of 1.0 to 1.1 milligrams per square inch. The coated panels were drawn into square cups 1 inch in height and 1-7/16 inches along each side. One area on the sides of the cups was deformed to a major strain of +20 percent and a minor strain of −12 percent. Another area on the sides of the cups was deformed to a major strain of +60 percent and a minor strain of −35 percent. The cup's corners were deformed to a major strain of +160 percent and a minor strain of −40 percent. The coated panels were fabricated (dry) with no additional lubricant.

"Control" panels from Comparative Example II which were coated with drawing lubricant FB-27MC and allowed to air dry were additionally smeared with an excess of fluid FB-27MC lubricant before stamping and drawing the panels into a square cup shape.

After being drawn into cups, the panels of temporary coating composition showed a uniform film over the entire square cup. Only minimal galling of the zinc substrate was noted at the corners of the drawn cups. A few scratches were noted on the sides of the cups. After cleaning by immersion in a one percent solution of CHEMKLEEN 49 for one minute at 150° F. and rinsing, a completely clean "water break free" formed cups resulted.

After being drawn into cups, the panels from Comparative Example II with the waterborne drawing lubricant showed a heavily galled and polished appearance on all four sides of the cup. The galling and polishing of these areas showed that the lubricant did not provide an effective fluid barrier between the stamping die and the substrate. After cleaning a formed cup by immersion in a one percent solution of CHEMKLEEN 49 for one minute at 150° F. and rinsing, the rinse water beaded up on the cup indicating that the lubricant was not removed effectively.

It is concluded that in comparison to conventional drawing lubricants, the temporary coating composition of Examples II and IV provides significantly better protection of the zinc surface from corrosion and fabrication. Yet, the protective coating composition exceeds the removability of conventional lubricants and thus allows the proper cleaning of formed parts.

EXAMPLE VI

WELDABILITY TEST

To study the spot-weldability, protective coating compositions of this invention containing wax and polymers of various glass transition temperatures and monomer compositions were prepared and applied at various film thicknesses. The compositions were prepared and applied in essentially the same manner as described in Examples II and III. Weldability was tested by two methods. In the first method, coated sheets were continuously spot-welded for at least 500 spot welds while observing whether the welding electrodes became coated with current-insulating char or whether they remained clean enough to conduct approximately 10,000 amps necessary for spot welding. In the second method, the coating's ability to be penetrated by spot-welding electrodes during a small number of welds was tested. Electrodes which had been degraded to some extent by continuous welding were used.

When approximately 10,000 amps could be passed through the electrodes and the coated sheet, the welding was considered successful. When a loud cracking sound was heard accompanied by black charring of the surrounding coating, while approximately 10,000 amps still flowed through the sheet, the spot welding was judged to be marginally acceptable. When the welding electrodes squeezed the panels together in the usual manner and no current flowed because of excessive electrical resistance, the spot welding was judged to be unacceptable. When some welds occurred normally with a current flow of approximately 10,000 amps but some welds were unsuccessful because of excessive electrical resistance, the weldability was judged to be barely weldable.

A pedestal-type spot-welding machine with a maximum electrical output of 22,000 amps at 6 volts was used for the welding tests. The machine used was a Model 150AP, available from Lors Corporation of Union, N.J. The electrodes squeezed the two sheets to be welded together with a force of 525 pounds which was a conventional, recommended squeezing force for spot welding two 0.030-inch galvanized steel panels.

Also in the first part of the weldability testing, a protective coating that was essentially the same as described in Example II was flow coated onto both sides of freshly cleaned electrogalvanized sheets, air dried until tack free, and forced dried for five minutes at 105° C. A film weight of 0.96 to 1.37 milligrams per square inch resulted. After making 750 spot welds on these sheets, the welding electrodes were still able to conduct approximately 10,000 amps through additional coated sheets. During the 750 weld test, occasional charring of the coating was noted on the side of the panels with the thicker coating weight of 1.3 milligrams per square inch, but no charring was noted on the area of the panels having about 1.0 milligrams per square inch of coating. Approximately 10,000 amps passed through each spot weld of the 750 weld test. The spot weldability of this particular coating was judged to be acceptable at about 1.0 milligrams per square inch and marginally acceptable at about 1.3 milligrams per square inch.

It was surprising and unexpected that the protective composition of this invention flowed away from the spot-welding electrodes under continual exposure to pressure and heat and that a progressive buildup of current insulating char did not occur.

In the second part of the weldability testing, the worn and degraded welding electrodes from the first weldability testing were used to test the protective coating composition's ability to be penetrated by spot-welding electrodes when using a conventional amount of squeezing force.

The following tables show protective compositions containing wax and polymers of various monomer compositions and glass transition temperatures and the evaluation thereof for welding electrode penetration.

TABLE I

| Polymer | Tg | % Butyl Acrylate | Styrene | % Acrylic Acid | % Dimethyl aminoethyl Methacrylate | % Wax |
|---|---|---|---|---|---|---|
| A | +5° C. | 47 | 30 | 20 | 3 | 15 |
| B | −11° C. | 60 | 20 | 20 | — | 15 |
| C | −27° C. | 73 | 7 | 20 | — | 15 |

The electrode penetration test yielded the following weldability results at the film weight stated in Table II hereinbelow:

TABLE II

| Polymer | Tg | Milligrams per Square Inch | Electrode Penetration Test |
|---|---|---|---|
| A | +5° C. | 1.0 | Acceptable |
| A | +5° C. | 1.3 | Marginally acceptable |
| B | −11° C. | 1.4 | Acceptable |
| B | −11° C. | 1.84 | Marginally acceptable |
| B | −11° C. | 2.58 | Barely weldable |
| C | −27° C. | 2.12 | Acceptable |
| C | −27° C. | 2.97 | Marginally acceptable |
| C | −27° C. | 5.5 | Barely weldable |

EXAMPLE VII (a) Flexibility: To test flexibility, electrogalvanized sheets were coated with the protective coating composition described in Example II. The coated panels were bent to a radius of 0.075 inches to what is called a "5T" bend, i.e., the coated sheet was bent over five thicknesses of the same sheet. The bent pieces were then immersed in a five-percent Cupric Nitrate ($Cu(NO_3)_2$) solution for ten seconds and then rinsed. A copper-containing deposit would form on any area of exposed zinc metal. Cracks or porosity of the protective coating compositions on a bent area would be evidenced by a brown or black color after the test.

Protective coating compositions which were prepared in essentially the same manner as described in Example II, containing the following polymers of various monomer composition and glass transition temperature, at film weights of about 0.8 to 1.1 milligrams per square inch were tested for flexibility:

TABLE III

| Polymer | Tg° C. | % Styrene | % Butyl Acrylate[1] | % Acrylic Acid | % Dimethyl aminoethyl Methacrylate | % Wax | 5T Bend + $CU(NO_3)_2$ Test |
|---|---|---|---|---|---|---|---|
| D | 35 | 50 | 30 | 20 | — | 2 | Black deposit |

TABLE III-continued

| Polymer | Tg° C. | % Styrene | % Butyl Acrylate[1] | % Acrylic Acid | % Dimethyl aminoethyl Methacrylate | % Wax | 5T Bend + CU(NO$_3$)$_2$ Test |
|---|---|---|---|---|---|---|---|
| E | 5 | 30 | 47 | 20 | 3 | 15 | Light gray deposit |
| F | −12 | 17 | 60 | 20 | 3 | 15 | No effect |

(b) Block-resistance: To test the block resistance, sheets of metallic substrate coated with the protective coating compositions which were prepared in essentially the same manner as described in Example II were pressed together in a stack with a force of 150 pounds per square inch of coated sheet at 120° F. for 16 hours and then cooled. The stack of sheets was then taken apart and the individual sheets tested for any film damage caused by the heat and pressure combined with any damage caused by separating the pieces, (referred to as "uncoiling pickoff"). To test film damage, the substrates which were subjected to the block resistance test were immersed in a five-percent Cupric Nitrate solution and rinsed, to observe any brown or black copper deposition at areas of extremely low film thickness, or at areas where the film has suffered from "pickoff" by adhering to another coated sheet during the block resistance test.

Protective coating compositions containing wax and polymers of various monomer compositions and glass transition temperatures as set forth below were tested at 1.4 to 1.5 milligrams per square inch of dry film on electrogalvanized steel. The compositions were prepared and applied in essentially the same manner as described in Example III.

TABLE IV

| Protective Polymer Composition | Tg | % Butyl Acrylate | % Styrene | % Acrylic Acid | % Wax |
|---|---|---|---|---|---|
| G | −11° C. | 60 | 20 | 20 | 15 |
| H | −27° C. | 73 | 7 | 20 | 15 |

After the block resistance test, the coating composition containing polymer H was found to have a dark dense copper deposition over most of the tested substrates, indicating poor film integrity after exposure to heat, pressure, and sheet separation. After the block resistance test, the coating composition containing polymer G showed only a very slight copper deposition over the tested area, indicating that this film was still capable of protecting the underlying metallic surface from physical abuse and corrosion.

As shown herein, the protective compositions of this invention, in addition to the properties of removability, drawability, and weldability, can be flexible and block resistant.

ADDITIONAL EXAMPLES

The following examples show the problems associated with the use of the protective coating compositions of this invention and the solutions therefor.

In studying the interactions of temporary protective coating with metal surfaces, special cleaning methods were used to produce a freshly prepared "activated" surface before application of the protective coating composition. Oily electrogalvanized steel was rubbed with a (3 parts to 1 part by weight) mixture of water/TRITON X-100 (a commercially available nonionic surfactant from Rohm and Haas Co., Philadelphia, Pa.), spray cleaned with a commercially available alkaline cleaner (such as CHEMKLEEN 49, available from Chemfil Corporation) for 40 seconds at 150° F., rinsed for 20 seconds in hot tap water, sprayed with deionized water, immersed for 5 to 10 seconds in 0.1 molar acetic acid solution, sprayed with deionized water, and air blown dry.

Part A

Control: A protective coating containing a water-based acrylic polymer "G" of Table IV was fully neutralized with ammonium hydroxide, thinned to 20 percent solids, applied by No. 6 wire-wound drawbar to the clean electrogalvanized steel panel, and baked for 50 seconds at 550° F. to a peak metal temperature of 420° F. and quenched. The coating was applied to the specially cleaned metal surface, within 30 seconds after the metal was cleaned and blown dry as set forth above.

After application and cure of the above temporary protective coating, the coated panel was tested for removability by immersion in a two percent solution of a commercially available alkaline cleaner B.A.S.E. Phase 5YN, available from J. M. Eltzroth & Associates, for 60 seconds at 140° F., rinsed for 30 seconds at 140° F. in tap water, and additionally rinsed with deionized water. After this cleaning process, the panel was judged to be unclean because water beaded up on the metal surface. Apparently, between the metal cleaning and the application of liquid coating the metal surface is sufficiently active to react with the applied protective coating.

Part B

A temporary protective coating was prepared having the same composition as the coating described in Part A except that ammonia neutralized phosphoric acid was added to the coating at a level of 0.79 grams of phosphoric acid per 100 grams of coating solids. After application of the coating to a specially cleaned electrogalvanized steel panel and cured in the same manner as described in Part A. The coated steel panel was exposed to the same alkaline cleaner and rinses as described in Part A, in order to test removability of the coating. A completely clean water break free steel panel resulted.

Part C

A temporary coating composition having the same composition as in Part A was applied to a freshly cleaned electrogalvanized steel panel and allowed to air dry for 90 seconds before baking. The delay in baking is believed to accentuate any interaction that might occur between the coating and the metal, since immediate baking would evaporate the amine or ammonium hydroxide and water more quickly from the film.

The temporary coating employed herein was essentially the same as in Part A. The coating was applied to a freshly cleaned electrogalvanized steel panel which was prepared as follows. An oily electrogalvanized steel was spray cleaned with a commercially available alkaline cleaner (two percent by volume solution of E303LF, available from J. M. Eltzroth & Associates) for 20 to 25 seconds at 150° F., immersion rinsed with tap water at 150° F., sprayed with water at 110° F., wiped off with a rubber squeege, and painted within one minute of wiping. After a 90 second air dry, plus a 37-second bake at 550° F. to a metal temperature of 400° F., a coating with a streaky brown staining resulted.

Part D

A protective coating composition having the same composition as in Part B containing an ammonia-neutralized phosphoric acid at a level of 0.79 grams of phosphoric acid per 100 grams of coating solids. After panel preparation and coating application and cure as described in Part C, no staining or color change appeared in the dried film of the coating.

Part E

Oily electrogalvanized steel was spray cleaned in a commercially available alkaline cleaner, CHEMKLEEN 49 for 20 to 25 seconds at 150° F., immersion rinsed with 150° F. tap water, sprayed with 110° F. tap water, acid rinsed by dipping into an acidic water solution which was made by adjusting tap water to a pH of 4.0 with a Final Rinse #45 acidic solution (available from J. M. Eltzroth & Associates) sprayed with 110° F. tap water, wiped off with a rubber squeegee, and painted within one minute with a protective coating as described in Part A. After a 90-second air dry plus a 37-second bake at 550° F. to a 400° F. peak metal temperature, brown staining resulted which was significantly lighter in color than without an acidic rinse.

Part F

Evaluation of Temporary Protective Coatings With and Without Acid Salt Additives: Electrogalvanized steel panels were prepared and coated as in Part C except that the baking step was omitted. The panels were coated with a temporary coating and air dried. A visual rating system was devised where the unmodified temporary coating (without the removability enhancing aid), which resulted in dark, brownish discoloration, was rated a 1, and the modified temporary protective coating with the removability enhancing aids, which resulted in no discoloration, was rated a 10.

The following table sets forth the removability enhancing means which are acids or salts thereof which were incorporated into a temporary protective coating and the visual color change rating which resulted. The temporary protective coating used herein was essentially the same as coating "G" of Table IV. A coating without an acid or salt thereof was employed as a control.

TABLE V

| Removability Enhancing Aid | Addition Level as Percent of Resin Solids of Coating | Color Rating |
| --- | --- | --- |
| None | — | 1 |
| Phosphoric Acid | 0.79 | 10 |
| Ammonium Carbonate | 1.56 | 3 |
| Ammonium Carbonate | 7.08 | 8 |
| Ammonium Dichromate | 1.02 | 10 |
| Ammonium Dichromate | 0.25 | 10 |
| Sodium Tripolyphosphate | 1.00 | 7 |

While the illustrative embodiments of the invention have been described hereinabove, it will be understood that various modifications will be apparent to and can be made by those skilled in the art without departing from the scope or spirit of the invention. Accordingly, it is intended that claims directed to the invention be construed as encompassing all aspects of the invention which would be treated as equivalents by those skilled in the art to which the invention pertains.

Therefore, what is claimed is:

1. A water-based coating composition for forming a temporary, protective coating on metallic substrates that is removable with aqueous cleaning solution comprising:

a base neutralized acid-functional polymer former from the polymerization of monomers of which at least 5 percent by weight include an acid functional group, the polymer having a glass transition temperature of about −30° C. to 100° C. and a weight average molecular weight of about 1,000 to 90,000;

a lubricant in an amount effective to render the coating drawable selected from the group consisting of wax, silicone fluid, molybdenum disulfide, graphite, hydrocarbon oil, vegetable oil, and fatty acid;

about 0.001 to 1 percent by weight based on the total resin solids of the composition of an inorganic acid or acid salt having a monovalent or mixture thereof.

2. The composition of claim 1 wherein the acid or acid salt for enhancing removability are selected from the group consisting of phosphoric acid, ammonium phosphate, ammonium carbonate, ammonium dichromate, and sodium tripolyphospate.

3. The composition of claim 2 wherein the acid or acid salt for enhancing removability include phosphate ions.

* * * * *